United States Patent
Soffer

(10) Patent No.: US 9,665,525 B2
(45) Date of Patent: May 30, 2017

(54) MULTI-HOST DOCKING DEVICE

(71) Applicant: High Sec Labs Ltd., Yokneam industrial zone (IL)

(72) Inventor: Aviv Soffer, Caesarea (IL)

(73) Assignee: HIGH SEC LABS LTD., Yokneam Industrial Zone (IL)

( * ) Notice: Subject to any disclaimer, the term of this patent is extended or adjusted under 35 U.S.C. 154(b) by 222 days.

(21) Appl. No.: 14/299,062

(22) Filed: Jun. 9, 2014

(65) Prior Publication Data

US 2015/0356045 A1    Dec. 10, 2015

(51) Int. Cl.
  G06F 1/16      (2006.01)
  G06F 13/40     (2006.01)
  G06F 1/20      (2006.01)
  G06F 13/42     (2006.01)

(52) U.S. Cl.
  CPC ........ G06F 13/4068 (2013.01); G06F 1/1626 (2013.01); G06F 1/1632 (2013.01); G06F 1/203 (2013.01); G06F 13/4221 (2013.01); *H04N 2201/0058* (2013.01)

(58) Field of Classification Search
  CPC ...... G06F 1/1632; G06F 1/1626; G06F 1/203; H04N 2201/0058
  USPC ...................................................... 710/303
  See application file for complete search history.

(56) References Cited

U.S. PATENT DOCUMENTS

| | | |
|---|---|---|
| 7,559,092 B2 | 7/2009 | Anson et al. |
| 8,738,080 B2 | 5/2014 | Nhiayi |
| 2005/0216620 A1 | 9/2005 | Sandulescu et al. |
| 2006/0123182 A1 | 6/2006 | Sandulescu et al. |
| 2008/0048975 A1* | 2/2008 | Leibow .................. G06F 3/023 345/156 |
| 2011/0145451 A1* | 6/2011 | Soffer .................... G06F 3/023 710/64 |
| 2011/0200121 A1* | 8/2011 | Costa .................... H04N 19/42 375/240.26 |
| 2011/0208963 A1 | 8/2011 | Soffer |
| 2013/0050084 A1* | 2/2013 | Soffer .................... G06F 3/023 345/163 |
| 2013/0067534 A1 | 3/2013 | Soffer |
| 2014/0015673 A1 | 1/2014 | Soffer et al. |

(Continued)

FOREIGN PATENT DOCUMENTS

| | | |
|---|---|---|
| GB | 2484736 A | 4/2012 |
| WO | 03009118 A2 | 1/2003 |
| WO | 2013035098 A | 3/2013 |

*Primary Examiner* — Glenn A Auve
(74) *Attorney, Agent, or Firm* — Browdy and Enimark, P.L.L.C.

(57) ABSTRACT

A serial protocol based Docking device having a single set of user peripherals supports multiple removable host computers having different video output types and different operating systems. The device provides mouse tracking function that switches the keyboard and mouse to the different host computers when the cursor is moved by the user across the respective display boundary. The docking device provides file-sharing and cut-and-paste functions across the different docked host computers. Laptops, table-tops as well as Smartphones, tablets and other forms of portable platforms are supported. Dragging an item from a display designated to a first host computer to a display designated to a second host computer performs moving or copying the item from the first host to the second host.

19 Claims, 11 Drawing Sheets

(56) References Cited

U.S. PATENT DOCUMENTS

Figure 1:
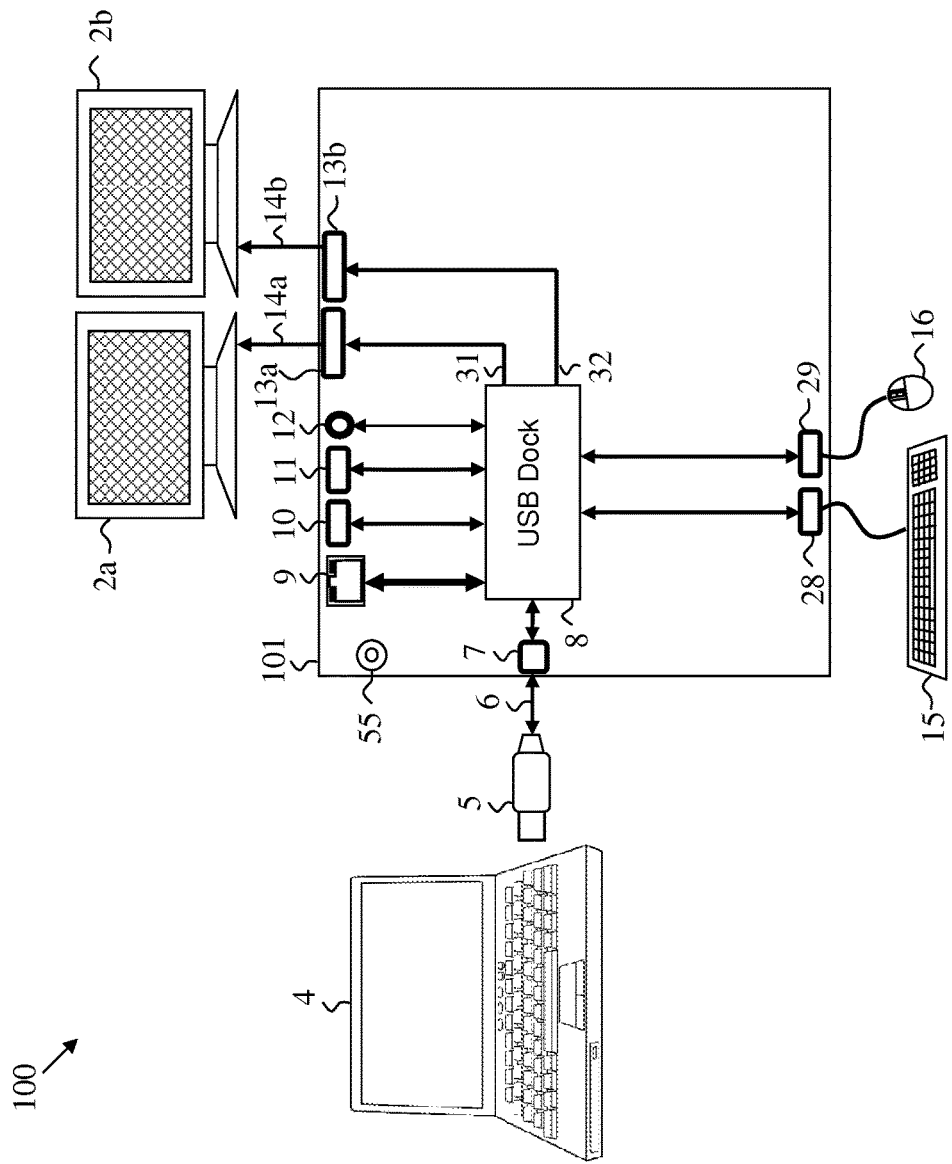

| | | | |
|---|---|---|---|
| 2014/0019652 A1* | 1/2014 | Soffer | G06F 21/83 710/73 |
| 2014/0043750 A1 | 2/2014 | Calderone et al. | |
| 2014/0053256 A1* | 2/2014 | Soffer | G06F 21/34 726/9 |
| 2014/0098485 A1 | 4/2014 | Vahid | |
| 2014/0344494 A1* | 11/2014 | Zeung | G06F 1/1632 710/303 |

* cited by examiner

MULTI-HOST DOCKING DEVICE

FIELD OF THE INVENTION

The present invention relates to a device that enhances computer operator usability in case that the operator is having multiple docked portable computers.

BACKGROUND OF THE INVENTION

Docking stations for laptop computers are well known in the art and are commercially available. For example, US 20140043750; titled "Laptop Computer Cooling and Docking Station"; discloses a laptop computer docking station and cooling device.

Targus LTD of Anaheim Calif. offers for sale USB 3.0 based docking stations such as USB 3.0 SuperSpeed™ Dual Video Adapter Model Number: ACA039US that allows adding up to two monitors to your laptop, which utilize HD graphics and video. Same company offers for sale the USB 3.0 SuperSpeed™ Dual Video Docking Station with Power, Model Number: ACP71 USZ, which provides up to 90 Watt power, Multi-format compatibility through dual video ports, DVI-I to VGA & HDMI to DVI-D Adapter, Multiple USB ports (2×USB 3.0, 4×USB 2.0), and Gigabit Ethernet port Docking stations for tablet computers are also known in the art. For example, US 20140098485; titled "Asymmetric Computer Tablet Frame Docking System"; discloses a system for docking a computer tablet with a docking station. The computer tablet has an asymmetrical edge that is adapted to rest in a cradle portion of the docking station. While resting in the docking station the computer tablet may be rotated to various angles and still maintain electrical connectivity to the docking station.

Docking stations for Smartphones are also known in the art. For example, U.S. Pat. No. 8,738,080; titled "Docking station for android cellphone"; discloses a system, method, and computer program product for a Smartphone docking station in digital camera and camcorder form factors. The docking station provides an attached Smartphone a better lens, image sensor, and image stabilization system for capturing pictures and videos, as well as a more familiar and steady user gripping and aiming platform for such photography.

The capability to interact with more than one computing device at a time was demonstrated for example in the following references:

US Application 20050216620 A1, titled: "KVM and USB peripheral switch"; to Francisc; et al. discloses a system and method for switching KVM and peripheral interfaces between host interfaces. Provided is a KVM switch where a keyboard and a mouse are emulated at host interfaces of the KVM switch and hosts are emulated at keyboard and mouse interfaces of the KVM switch. In addition, the KVM switch provided is capable of switching, either independently or concurrently with a keyboard and mouse, additional peripherals, such as USB peripherals.

US application 20060123182; titled: "Distributed KVM and peripheral switch"; to Francisc; et al.; discloses a system and method for switching keyboard and mouse devices and video displays, as well as USB peripheral devices, between USB hosts and video sources over extended distances. Provided is a distributed KVM and peripheral switch where a USB keyboard and mouse is emulated to the host interfaces of the KVM and peripheral switch and a USB host is emulated to keyboard and mouse interfaces of the KVM and peripheral switch. In addition, the keyboard, mouse, display and peripheral devices are separated from the hosts and video sources by a non-USB communications channel.

U.S. Pat. No. 7,559,092; titled "Secured KVM switch"; to Anson, et al.; discloses method that supports secure input/output (I/O) communications between an I/O device and a data processing system via a keyboard, video, and mouse (KVM) switch. An example embodiment includes the operations of establishing a first secure communication channel between the KVM switch and the I/O device and establishing a second secure communication channel between the KVM switch and the data processing system. In addition, I/O data may be received at the KVM switch from the I/O device via the first secure communication channel. In response to receipt of the I/O data from the I/O device, the I/O data may be transmitted from the KVM switch to the data processing system via the second secure communication channel. Embodiments may also include support for non-secure channels between the KVM switch and nonsecured I/O devices, nonsecured data processing systems, or both.

WO 2003009118; titled "Computer multiplexor" discloses a computer multiplexor connects a keyboard and mouse via interfaces to configuration stores and link enable devices respectively. Certain of the connections are unidirectional: they provide for arranged to inhibit communication between the plurality of computers while providing for necessary data flow to and from one of the plurality of computers selected for operation in conjunction with the multiplexor.

GB2484736; to William Stoye; titled "Image generation"; discloses a method of generating an image comprises receiving a signal over a USB interface comprising encoded display data for one or more rectangular group of pixel tiles within an image and position data for the or each group of pixel tiles. The coefficients are obtained from the encoded display data, maybe by converting variable bit length fields into AC coefficients and an inverse Haar transform performed on them to generate pixel data for each rectangular group of pixel tiles. A frame buffer, which may be part of the display, is then updated with the generated pixel data ready for output to the display device. Copy protection may also be incorporated using AES negotiated over HDPC.

Texas Instruments, of Dallas, Tex. USA, provides USB Charging Port Power Switch and Controller such as TPS2540, TPS2540A, TPS2541, TPS2541A. The TPS2540/40A and TPS2541 141 A are a combination of current-limited USB port power switch with a USB 2.0 high-speed data line (D+/D−) switch and a USB charging port identification circuit. Applications include notebook PCs and other intelligent USB host devices. The wide bandwidth (2.6 GHz) data-line switch also features low capacitance and low on resistance, allowing signals to pass with minimum edge and phase distortion. The TPS2540/40N41 141 A monitors D+ and D−, providing the correct hand-shaking protocol with compliant client devices. The TPS2540/40N41 141 A supports the following charging logic schemes: USB 2.0 BC1.2; Chinese Telecom Standard YDIT 1591-2009; and Divider Mode, compliant with Apple devices such as iPod® and iPhone®.

Texas Instruments also provides the very low cost HD3SS2521 DockPort controller. The HD3SS2521 is an integrated DockPort switch solution. It provides independent 2:1 passive switching for the SuperSpeed USB and Display Port signals as well as for the USB 2.0 (HS/FS/LS) and I2C necessary to support DockPort applications. In addition, a firmware upgradable integrated DockPort controller is provided to manage host and dock side DockPort detection, signal switch and power configuration.

Additional background information may be found in the following patent applications of inventors of the present invention:

US 20110208963 Secured KVM system having remote controller-indicator

US 20130050084 Secure KVM system having multiple emulated EDID functions

US 20130067534 Computer motherboard having peripheral security functions

US 20140053256 User authentication device having multiple isolated host interfaces US 20110145451 Isolated multi-network computer system and apparatus US 20140015673 Secure peripheral connecting device US 20140019652 Secure km switch WO 2013035098 Single optical fiber KVM extender

SUMMARY OF THE EMBODIMENTS

The preferred embodiment of the current invention provides a docking device that supports multiple removable host computers while having a single set of user peripherals such as keyboard and mouse. Another embodiment of the current invention provides mouse tracking function that switches the keyboard and mouse to the different host computers when the cursor is moved by the user across the respective display boundary. Yet another embodiment of the current invention provides file-sharing and cut-and-paste functions across the different docked host computers.

Smartphones, tablets and other forms of portable platforms are widely used today. Computer users seating near their desk at home or at work are challenged with the attention switching between their PC, Laptop and mobile phone while working. The concept of Bring Your Own Device (BYOD) added another dimension to this challenge as many corporate and enterprise users are trying to perform their daily work while interacting with two, three or more different platforms having different operating systems and different displays, pointing devices and peripherals. Many users would like to share their displays, keyboard, mouse and audio devices across their different computers. Still since these computers are very different in terms of video, power and peripheral interfaces, the integration is complex and requires strong integration skills.

Exemplary embodiments of the current invention enable seamless desktop integration of multiple portable and fixed computer devices into one usable working environment.

Exemplary embodiments of the current invention provides a unified platform to interact and work with a plurality of computing or communication devices, even if some of the devices are of different types (PC, laptop, tablet, PDA, Smartphone, etc.) and even is some of the devices are using a different operating systems (Windows, Windows Mobile, Linux, Android, iOS, Chrome, etc.). Exemplary embodiments of the invention enable interacting with a plurality of computing or communication devices in an intuitive and user friendly way. Exemplary embodiments of the invention enable connecting the plurality of computing or communication devices without the need of connecting multiple cables and connectors and require no computer knowledge and skills for connecting the device and configuring the system.

In view of the operational difficulties experienced by computer users having more than one portable or fixed computer to operate simultaneously, and in view of the shortcoming of prior art docking station methods and devices, there is a need for a multi-host docking device that at least will:
1. Enable keyboard and mouse sharing between connected host computers;
2. Will enable simultaneous video output viewing from multiple host computers; and
3. Will provide mouse tracking function to enable automatic switching between host computers.

To further leverage such device usability, it is desirable that the following derivatives will be provided:
Device derivative that further support multiple displays from same host computer;
Device derivative that provides video processing to enable simultaneous view of video sources from multiple computer hosts on one or more user displays.
Device derivative that provides file and clipboard sharing function between the multiple host computers.

It is an object of the current invention to provide a Multi-Host Docking Device comprising: at least one user peripheral interface to interface with user keyboard and user pointing device; at least one Host Emulator connected to said at least one user peripheral interface to emulate computer host stack to interact with said user keyboard and user pointing device; at least a first and a second Device Emulators to emulate keyboard and mouse; at least one multiplexer to switch signals from said at least one Host Emulator between said at least a first and a second Device Emulators; at least a first and a second host interfaces to connect a first host computer and a second host computer respectively, wherein said first and second host interfaces capable of interfacing said first and a second Device Emulators with said first host computer and a second host computer respectively, and wherein said first and second host interfaces capable of receiving display data from said first host computer and a second host computer respectively; at least one video multiplexer to multiplex display data of said first host computer and said second host computer to at least one display output; a selector to enable user selection of one of said first or second host computers; and an Arbiter connected to the said first and second Device Emulators, said Arbiter is configured to enable clipboard and file transfer between said at least first and second host computers.

In some embodiments, at least one of said at least a first and a second host interfaces is a USB interface.

In some embodiments, the Multi-Host Docking Device further comprises a memory coupled to said arbiter to enable temporary data storage.

In some embodiments, the Multi-Host Docking Device further comprises a System Controller capable of performing cursor tracking.

In some embodiments, the System Controller is capable managing the Multi-Host Docking Device.

In some embodiments, at least one of said at least a first and a second host interfaces is a Docking cradle having physical form factor to support a specific class of mobile computing devices.

In some embodiments, the Docking cradle is a modular cradle external to the Multi-Host Docking Device.

In some embodiments, the Docking cradle at least one of said at least a first and a second host interfaces comprises an internal video conversion function to convert the native video output format of the corresponding host computer into another format to be used inside the docking device.

In some embodiments, the video multiplexer is capable of interfacing with at least one primary display and at least one secondary display.

In some embodiments, the video multiplexer is capable of displaying video signals from said first host computer on said primary display capable of switching said secondary display to display video signals from either one of said first host computer or said second host computer.

In some embodiments, the video multiplexer is a video processor capable of combining video signals from said first host computer with video signals of said second host computer.

In some embodiments, the Multi-Host Docking Device further comprises at least one video converter to convert the native video output format of at least one said first and second host computers into another format to be used within the docking device.

In some embodiments, the Multi-Host Docking Device further comprises an audio multiplexor multiplexer capable of receiving audio signals from said at least first and second host computers, and transmitting output audio signal to an external audio connector.

In some embodiments, the output audio signal is audio mixture of audio signals received from said at least first and second host computers.

In some embodiments, the audio multiplexor multiplexer capable of receiving input audio signals from said external audio connector and switch said input audio signals between said at least first and second host computers. In some embodiments at least one of said at least a first and a second host interfaces is a wireless interface.

In some embodiments, the wireless interface is capable of communication video signals.

In some embodiments, the wireless interface is capable of communication audio signals.

In some embodiments, at least one of said at least first and second host interfaces is capable of charging the corresponding host computer.

To enhance security and to prevent theft of the host computers, the Multi-Host Docking Device may be equipped with a physical locking device for locking at least one of the host computers to the Multi-Host Docking Device.

The physical locking device may be based on a physical lock and key. The physical locking device may be integrated into the cradle into which a host computer is inserted. Alternatively, the lock may be integrated into the docking device. Alternatively, the lock may be tethered to a cable similar for example to MicroSaver® T-Bar™ Locks available from Kensington LTD.

Alternatively, the physical lock may be integrated into a USB plug. For example a special USB eLock plug may be used to lock the plug inside a USB jacks. In order to release an eLock plug electronically, the eLock receives an unlock command over the USB cable, and powers a solenoid inside the plug to unlock it from the jack it is in.

Optionally, the Multi-Host Docking Device may be attached or locked to a bulk object such as a desk or an anchor attached to the wall using anchoring device. The anchoring device may be based on a physical lock and key. For example the anchoring device may be tethered to a cable similar for example to MicroSaver® T-Bar™ Locks available from Kensington LTD. Alternatively, the anchoring device may be bolted to the desk.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 illustrates a high-level functional block-diagram of a typical prior-art USB 3.0 docking station having two user displays.

Figure 2A:
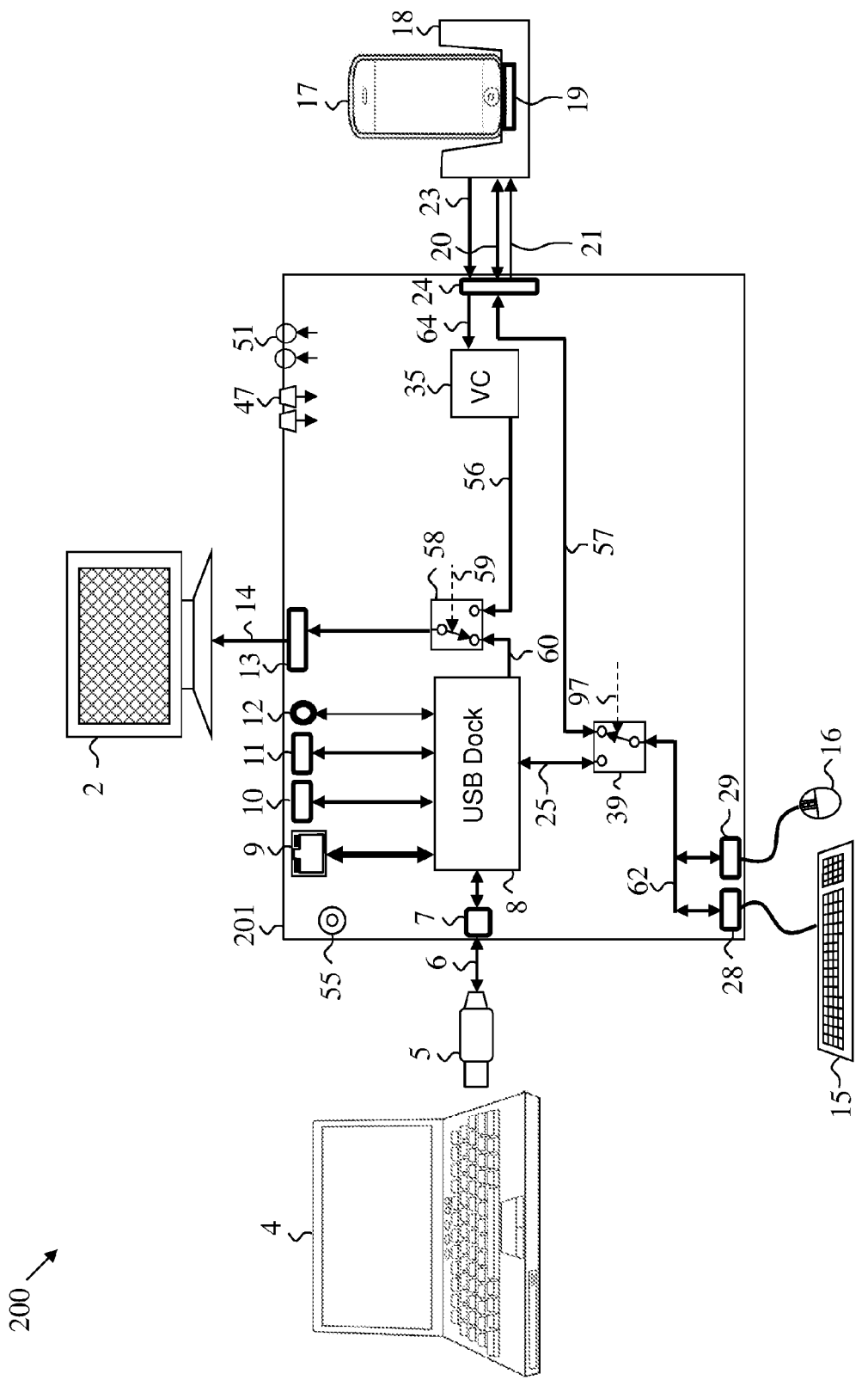

FIG. 2A schematically illustrates a high-level functional block-diagram of an exemplary embodiment of the current invention having two connected host computers.

Figure 2B:
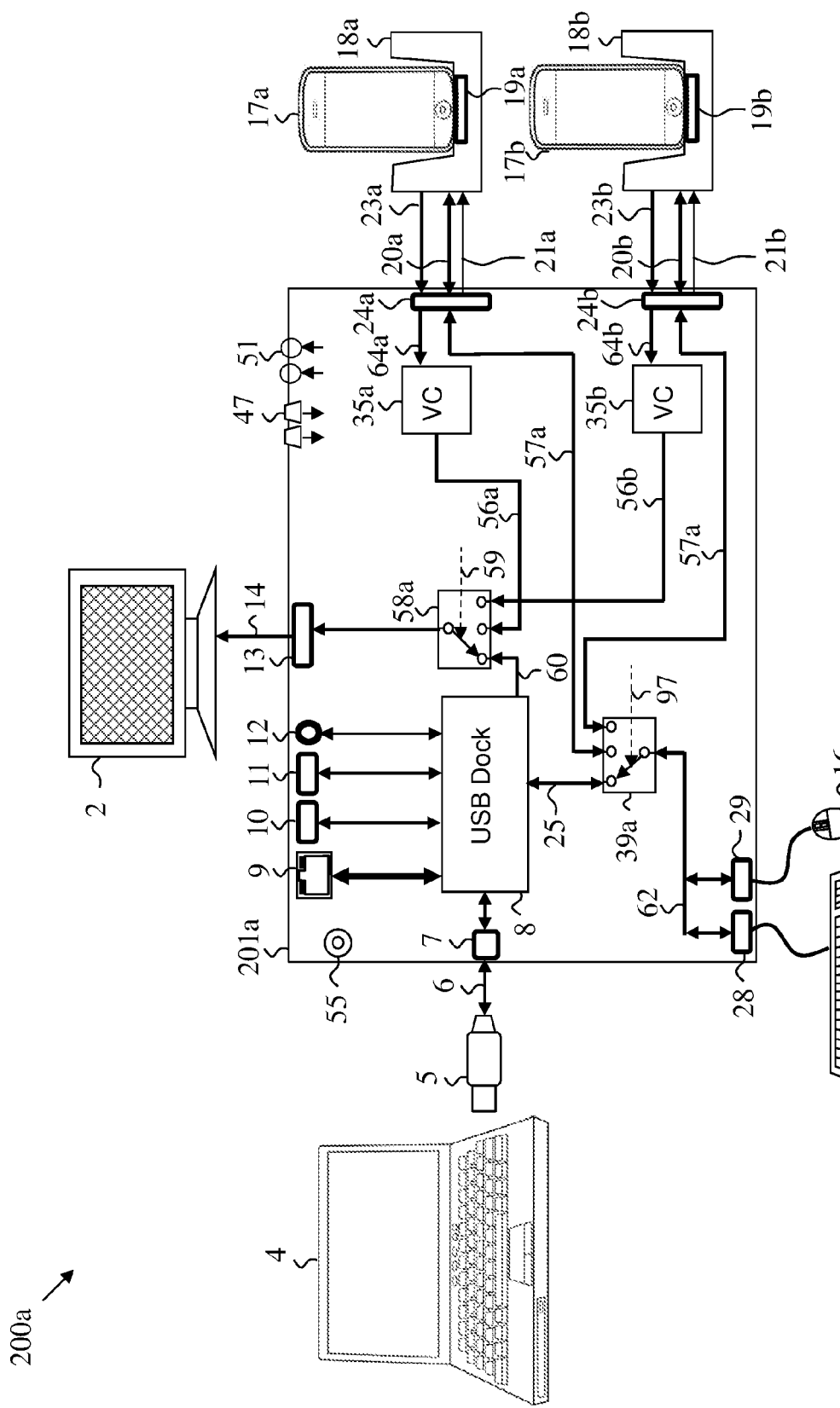

FIG. 2B schematically illustrates a high-level functional block-diagram of an exemplary embodiment of the current invention having three connected host computers.

Figure 3:
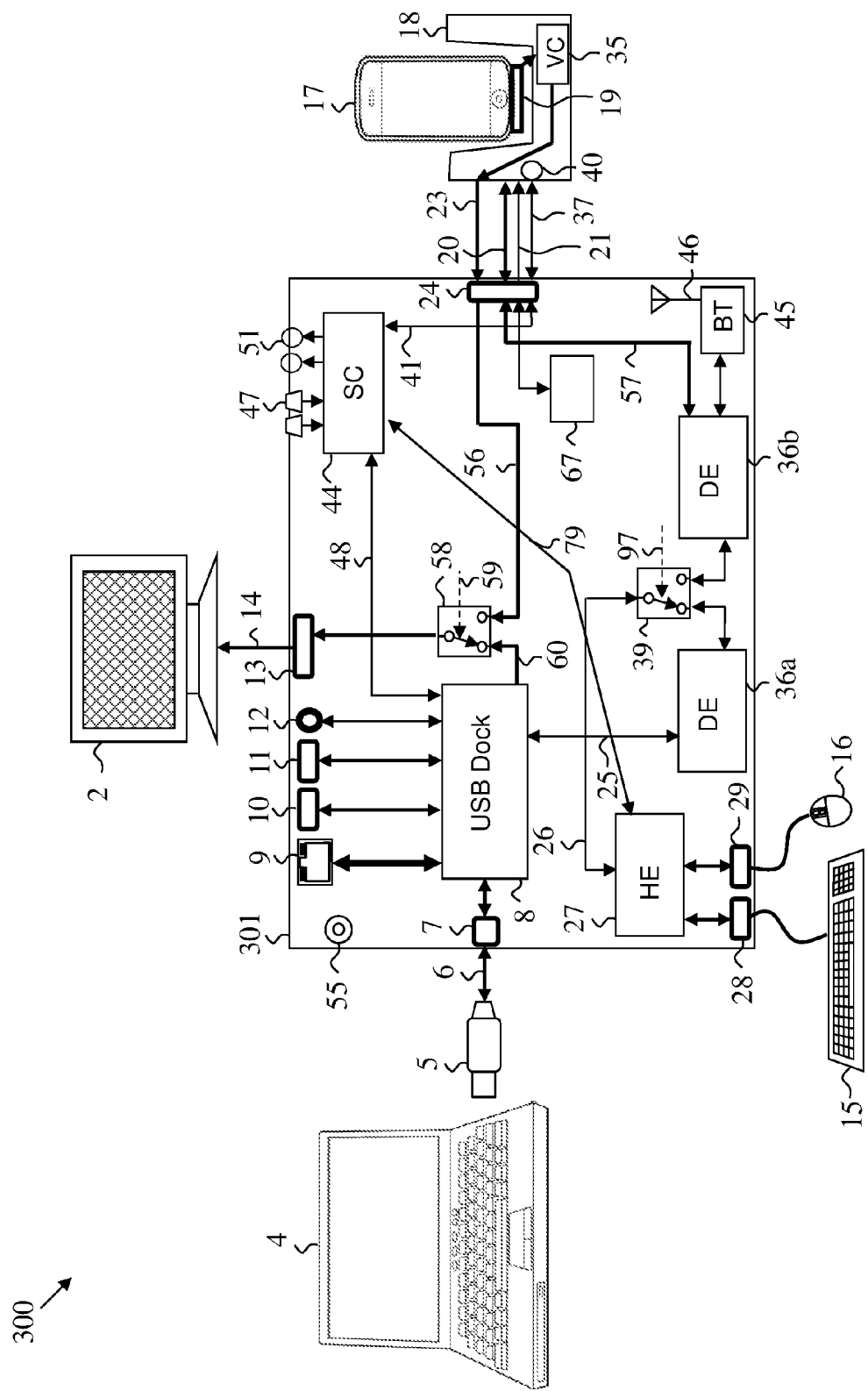

FIG. 3 schematically illustrates another high-level functional diagram of an exemplary embodiment of the current invention that is similar to the device shown in FIG. 2 above, but it is further having multiple Device Emulators and one Host emulator.

Figure 4:
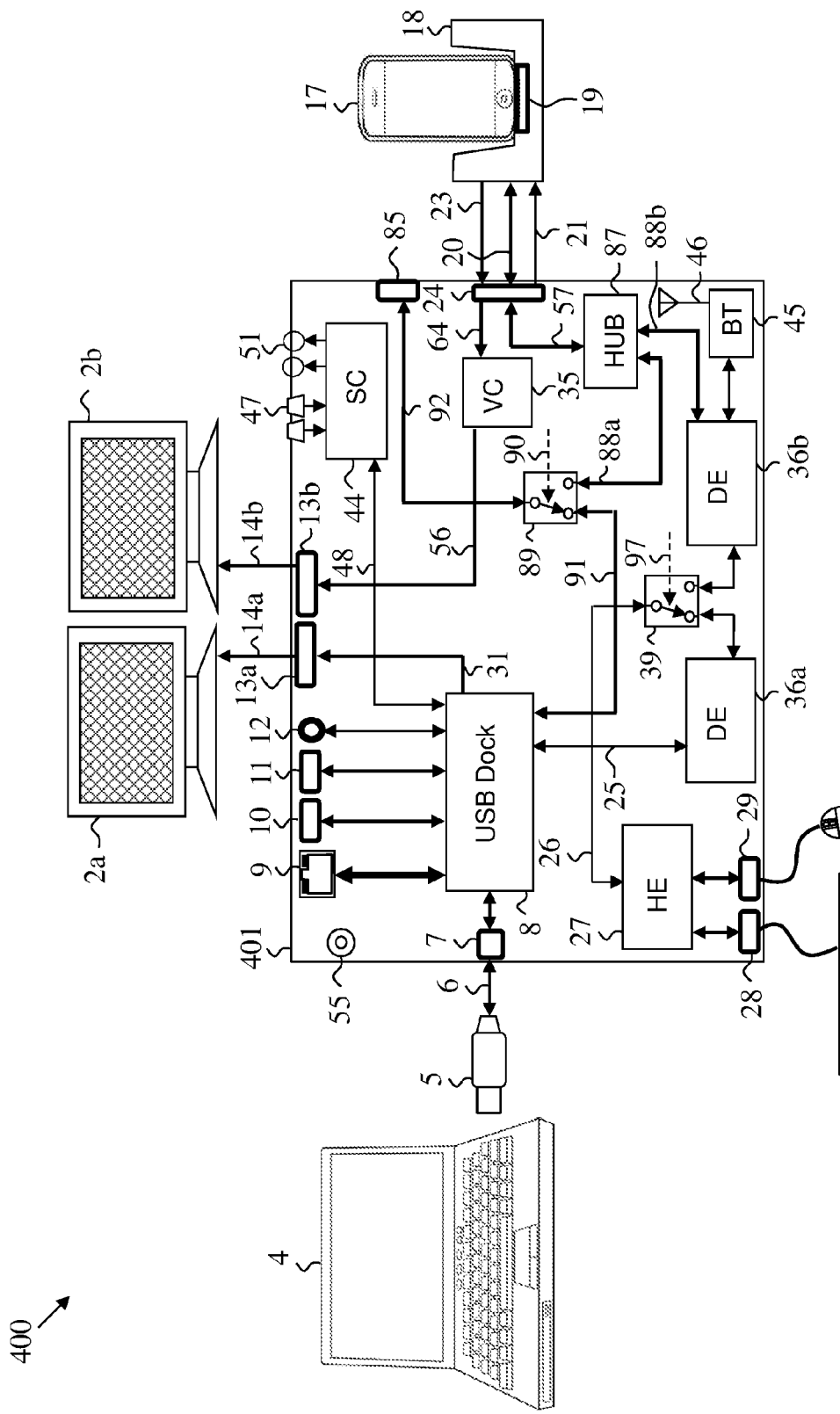

FIG. 4 schematically illustrates yet another high-level functional diagram of an exemplary embodiment of the current invention that is similar to the devices shown in previous FIGS. 2 and 3 but it is further supports two user displays.

Figure 5:
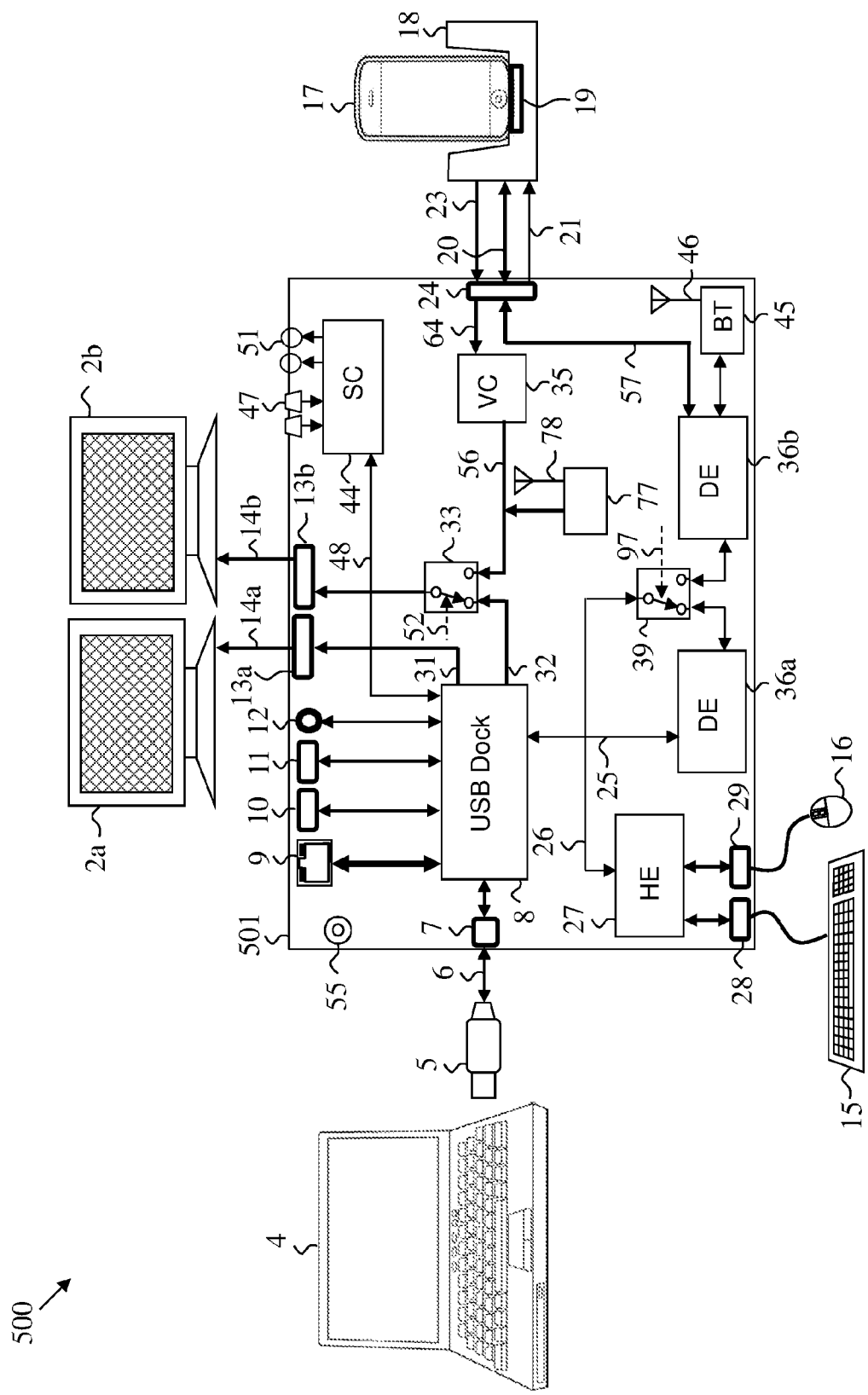

FIG. 5 schematically illustrates yet another high-level functional diagram of an exemplary embodiment of the current invention that is similar to the device shown in FIG. 4 above, but it is further supporting dual head display output from the primary host computer.

Figure 6:
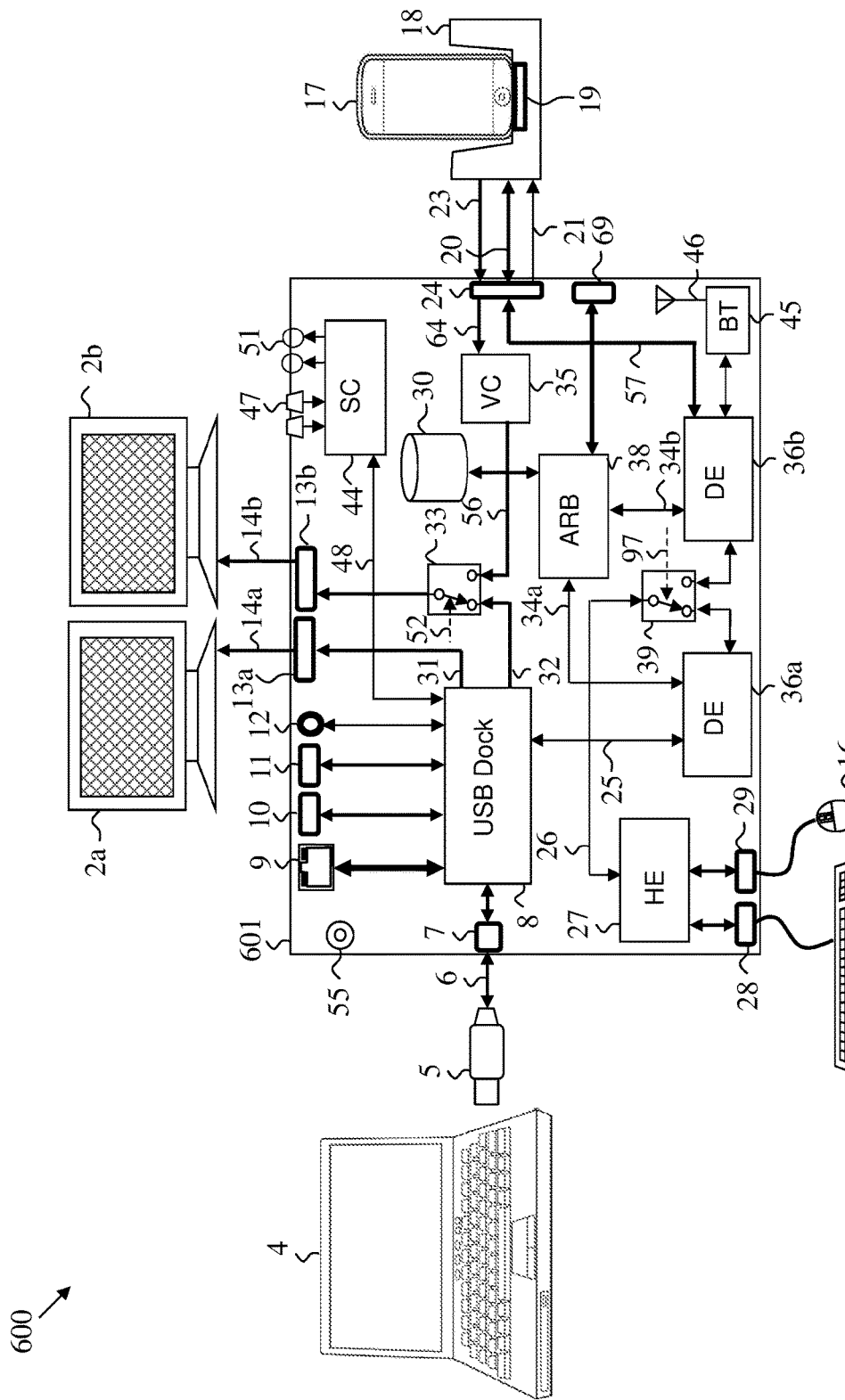

FIG. 6 schematically illustrates yet another high-level functional diagram of an exemplary embodiment of the current invention that is similar to the device shown in FIG. 5 above, but it is further having a managed copy-paste or file transfer function to assist the user in transferring data between host computers.

Figure 7:
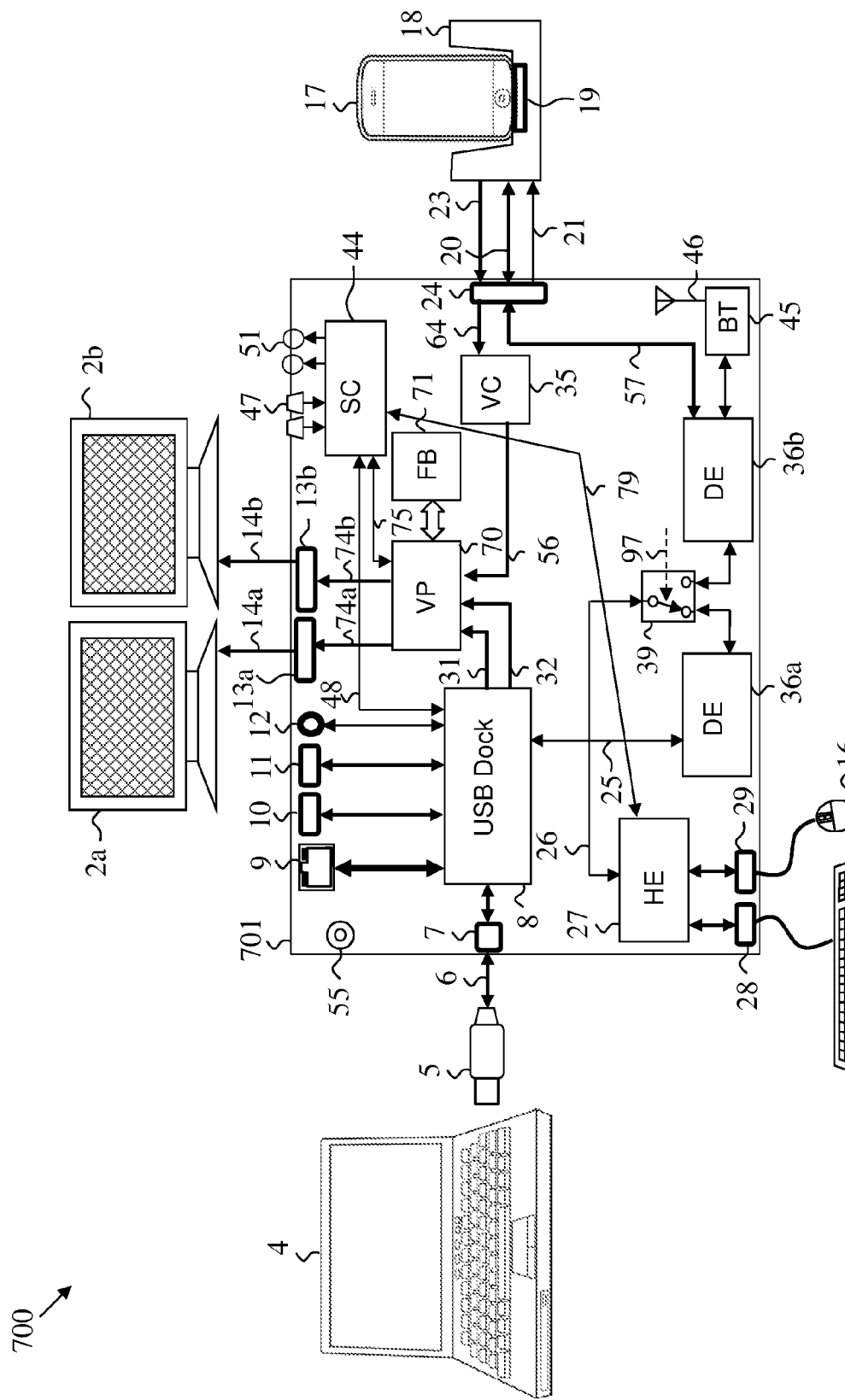

FIG. 7 schematically illustrates yet another a high-level functional diagram of an exemplary embodiment of the current invention that is similar to the device shown in FIG. 6 above, but it is further having a video processing function to enable video combination and overlay of the host computers video outputs.

Figure 8:
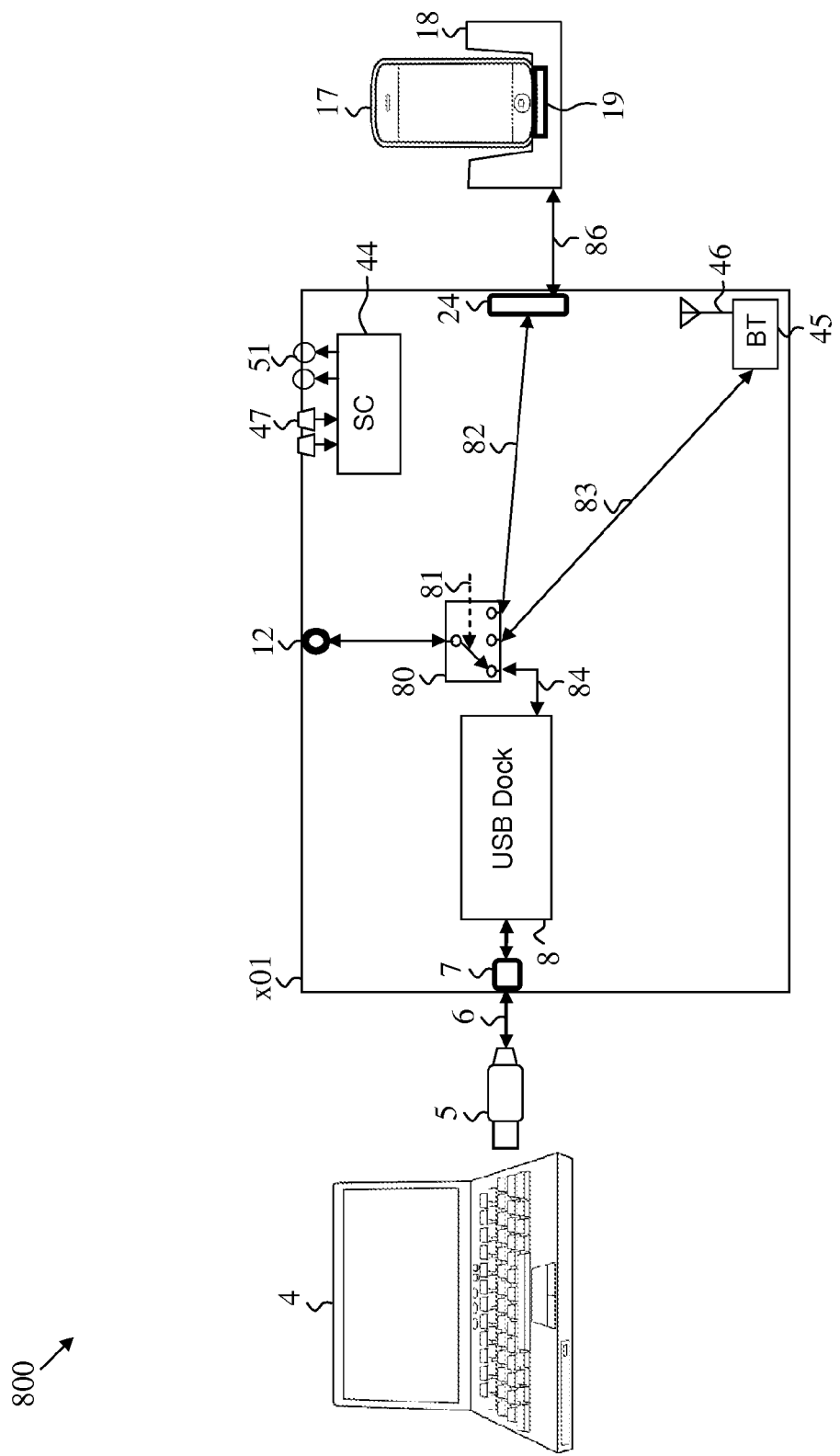

FIG. 8 schematically illustrates a high-level functional diagram of the audio subsystem in the embodiments shown in FIGS. 2 to 7 above.

Figure 9:
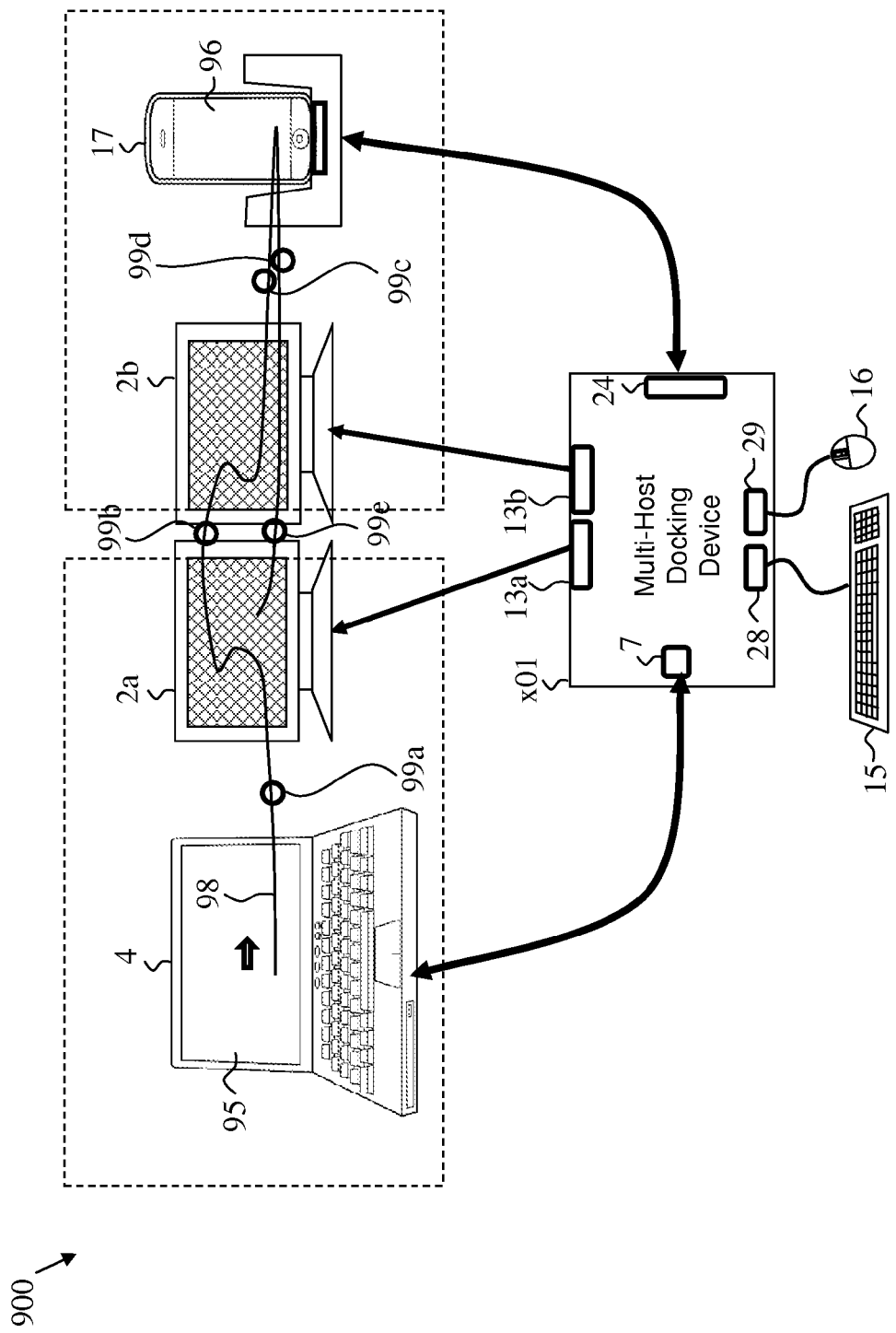

FIG. 9 schematically illustrates a typical operational scenario of the exemplary embodiment of the current invention while in cursor tracking mode.

Figure 10:
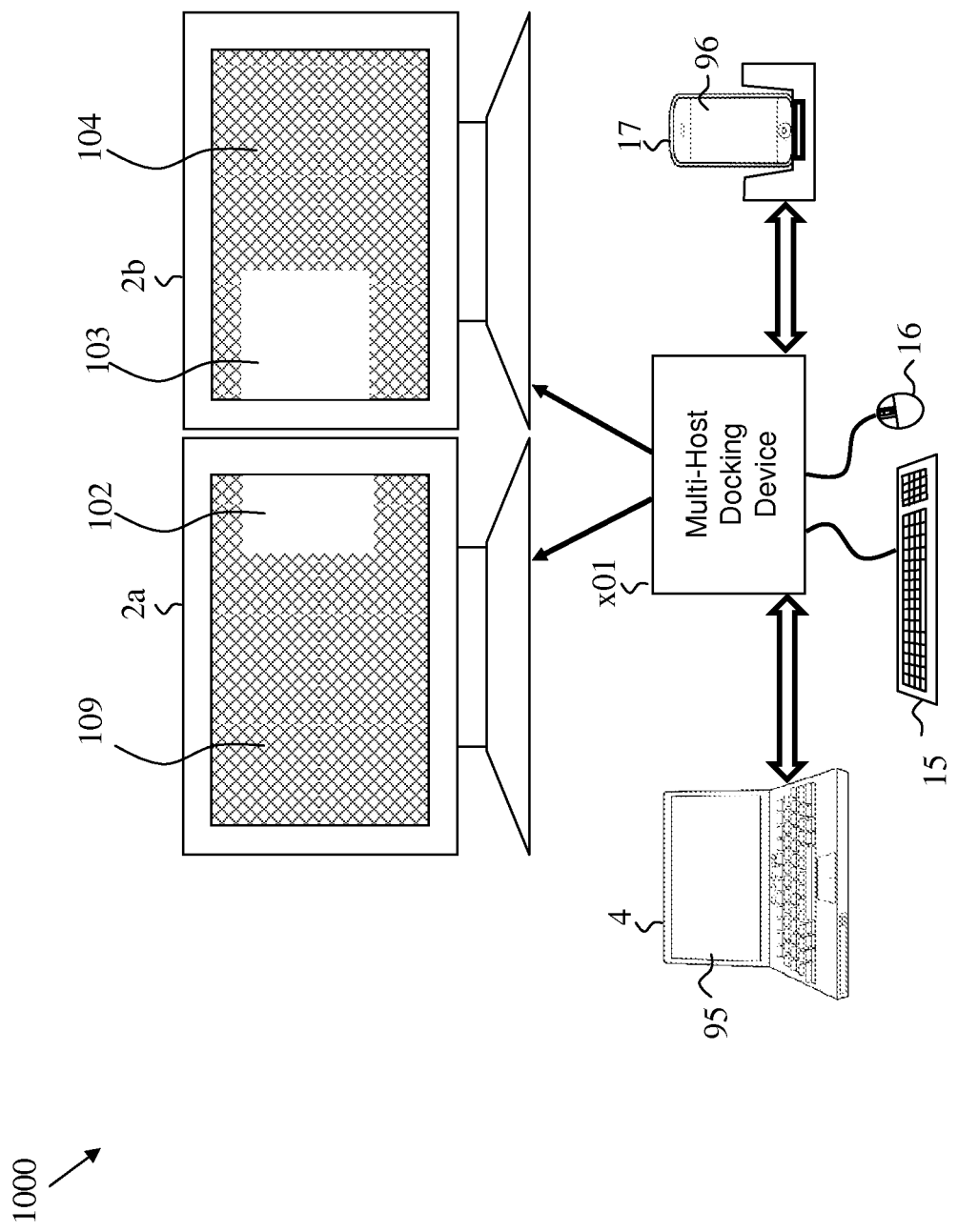

FIG. 10 schematically illustrates a typical operational scenario of the exemplary embodiment of the current invention while in combiner mode.

DETAILED DESCRIPTION OF THE DRAWINGS

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand alone programs, may be incorporated as subroutines in an operating system, may be functions in an installed software package, and the like.

FIG. 1 illustrates a prior art USB (Universal Serial Bus) 3.0 Docking station having two displays. In this system 100, host computer 4 may be a PC, laptop computer, Mac (Apple) platform, Android platform, Desktop computer, iPhone, iPad, Tablet or any other compatible computer platform. Plug 5 is USB 3.0 type-A plug connected to host computer 4 suitable serial port. Cable 6 is USB 3.0 serial interfaces cable having a USB 3.0 Type-B plug or micro USB 3.0 Type B plug connected to the docking device 101 USB 3.0 host port 7.

Host port 7 is coupled to the USB Docking controller chip 8 (USB Dock) that converts the serial stream (USB 2.0, USB 3.0, DockPort, ThunderBolt or other) into the various functions supported such as Ethernet, peripherals, video, and audio. USB Docking controller chip typically operating with a dedicated video decoder that matches the video encoder running at the host computer. This video encoder compresses the video generated in that computer and sends it over the USB link. For example prior-art device described in UK Patent application GB2484736A describes a device that uses DisplayLink's DL3 CODEC. This device is structured so that a low compute load is placed on the host system to encode and transmit the video data with very low latency caused by the sequence of encoding, transmitting over USB, decoding and displaying so that a human user finds the USB-connected display to be an acceptable replacement for a display connected via a dedicated video signal cable.

It should be noted that USB Docking controller chip 8 may be implemented in other ways than a single electronic chip. For example it may be implemented using a plurality of components, or it may be implemented as a part of a subunit or component that performs other functions or as an FPGA, ASIC, System On A Chip etc.

USB docking controller chip 8 may be DisplayLink DL-3900, another standard or custom chip, an ASIC (Application Specific Integrated Circuit), an FPGA (Field Programmable Gate Array) or any other suitable chip or chipset. This chip or chipset is often connected to external memory chips (not shown in this and in the following figures to avoid cluttering).

USB docking controller chip 8 may be also DockPort controller chip such as TI HD3SS2521 that enables low-cost and simple connection of USB, DisplayPort and power through one small connector.

It should be noted here that the USB docking controller chip function 8 provides KVM (Keyboard, Video, Mouse) connections to a host computer. The introduction of compact high bandwidth serial interfaces such as USB 3.0 enabled complete peripherals docking function to be linked via serial port. While traditional docking stations used big connectors with large number of pins (each assigned to a unique peripheral function), the use of 4 or 6 pin small USB connector, enable support for wide set of peripherals:
1. One or more high-resolution displays;
2. Keyboards, mice and various USB 2 and USB 3.0 peripherals;
3. Wired LAN;
4. Analog audio in and out, etc.

USB docking controller chip 8 is coupled to the following docking device 101 ports:
LAN (Local Area Network) port jack 9. Typically 100 Mbps, 1 Gbps or 10 Gbps Ethernet port having internal or external magnetic (isolation transformer). This port is used to connect the host computer 4 to the wired LAN infrastructure.
USB ports 28 and 29 used to connect user keyboard 15 and user mouse 16 to the computer platform 4.
General purpose USB 2.0 or USB 3.0 ports 10 and 11 used to connect any USB peripheral device to host computer 4.
One or more analog audio jacks 12 used to connect analog audio peripheral devices such as headset, microphone or speakers to the host computer 4.
Primary display port 13*a* connected to primary display 2*a* via cable 14*a* is used to display video output from host computer 4. Primary display port 13*a* is coupled to the USB dock controller chip 8 through video link 31. This video link may be DVI, HDMI, VGA, DisplayPort or any other standard video format.
Similarly optional Secondary display port 13*b* connected to primary display 2*b* via cable 14*b* is used to display video output from host computer 4. Primary display port 13*a* is coupled to the USB dock controller chip 8 through video link 32

Docking device 101 is typically powered by an external AC/DC power supply (not shown in this figure) connected to the device 101 through DC jack 55. This external power source may be used to power the host computer 4 via serial cable 6 or via another dedicated power cable connecting docking device 101 and host computer 4.

DC jack 55 may also provide power to charge connected devices through powered USB 2 or 3.0 ports 10 or 11. USB Charging Port Power Switch and Controller may be added to device 101 to enable controlled and safe high-current charging to connected devices.

FIG. 2A illustrates a high-level functional diagram of an exemplary embodiment of the current invention having two connected host computers.

In this system 200, a Docking Device 201 supports two host computers—
1. First host computer 4 is coupled to Docking Device 201 via serial cable 6, and:
2. Second host computer 17 positioned in a cradle 18 and connected through docking connector 19 and: video cable 23; data cable 20 and optional power line 21. It should be noted that docking cradle 18 may be integrated inside the docking device 201.

FIG. 2B illustrates a high-level functional diagram of an exemplary embodiment of the current invention having three connected host computers.

In this system 200a, a Docking Device 201a supports three host computers—
1. First host computer 4 is coupled to Docking Device 201 via serial cable 6, and:
2. Second host computer 17a positioned in a cradle 18a and connected through docking connector 19a and: video cable 23a; data cable 20a and optional power line 21a.
3. Third host computer 17b positioned in a cradle 18b and connected through docking connector 19b and: video cable 23b; data cable 20a and optional power line 21a.

Docking Device 201a differs from Docking Device 201 of FIG. 2A in that:
lines 57, 56 64 were doubled to 57a, 56a 64a and 57b, 56b 64b;
interface connector 24 and VC 35 doubled to 24a, 35a and 24b, 35b; and
additional positions were added to multiplexers 58a and 39a to support three hosts.

Due to the similarity of Docking Devices 201 and 201a the explanation given herein applies for both, and the suffixes "a" and "b" were omitted.

It should be noted here that the terms "docking cradle 18", "docking connector 19" and their associated cables 23, 20 and 21 should be viewed as general means to interface with second host computer 17. This "docking cradle" may be a cable, cage, housing, cable over-mold etc. A plurality of o optional cradles 18 may be offered, each designed to match a specific type, make, model, or class of second host computers 17. The term "cradle 18" should be viewed as general data link interface with the second host computers 17, and not limited to a "cradle". Additionally, second host computers 17 may not be limited to hand held device. Depending on the make and model of second host computer 17, its interface form factor and protocol may vary. For example some Smartphones may include internal large screen video output and a dedicated video connector; others may have charging connected or audio connector separate from the data connector, etc. Thus, one or more connectors may be used. Alternatively, some mobile devices are capable of interfacing without physical connector. For example commercial products are available that provide wireless charging of mobile devices. Short range RF or IR wireless communication protocols may also be used. A physical "cradle", although comfortable to use, is not essential and may be replaced with a cable terminated with a connector or a pad on which second host computer 17 is placed (without physical support of the second host computer 17).

Second host computer 17 may be laptop computer, Mac (Apple) platform, Android platform, iPhone, iPad, Desktop computer, Tablet, Smartphone, or any other computer platform which can be interfaced.

Second host computer 17 is coupled to the Docking Device 201 through second host computer interface connector 24 and cradle 18.

Host computer interface connector 24 and cradle 18 may be modular to enable easy adaptation to large number of host computer models.

Keyboard 15 and mouse 16 are jointly connected via line 62 to peripheral multiplexer 39 on one side to enable selection between to two host devices:
First host computer 4 is coupled through line 25, USB Docking controller chip 8, host port 7 and cable 6; or:
Second host computer 17 is coupled through line 57, connector 24, data lines 20, and cradle connector 19.

User may select the active host computer by means of push buttons 47 which activates multiplexer 39 via control line 97. LEDs indicators 51 indicated to the user which host is currently active.

Similarly user may select the active host to see video output on display 2 using video multiplexer 58. Video multiplexer 58 is coupled to the user display 2 via display port 14 and display cable 14. It switches between:
First host computer 4 that is coupled through primary video output line 60, USB Docking controller chip 8, host port 7 and cable 6; or:
Second host computer 17 that is coupled through video line 56, video format converter (VC) 35, video line 64, connector 24, video line 23, and cradle connector 19.

User may select the active host computer by means of push buttons 47 which activates video multiplexer 58 via control line 59. LEDs indicators 51 indicated to the user which host is currently displayed.

Power line 21 connecting the docking device 301 second host connector 24 and the cradle connector 19, enable second host platform 17 operation and charging from same DC source connected to DC jack 55.

This exemplary embodiment of the current invention enables the user to comfortably interacting with two host platforms potentially having two different operating systems, and potentially having two different display formats, through a single set of peripheral devices.

Similar embodiment of the current invention may be expanded to support more than two host computers as needed.

It should be noted that Video Converter function 35 is optional. Some host computer platforms 17 may natively generate video format that is different from the format generated by the Docking controller chip 8 and therefore format conversion is needed. Since there is no single video format across the various types of products and vendors, the docking device 201 is designed to support the widest range of computer platforms. Thus, docking device 201 is modular and supports various interface formats.

For example, if display 2 and USB docking controller chip 8 supports HDMI video format, and second host platform 17 support only MHL (Mobile High-Definition Link) output, then video format converter 35 may be needed in order to convert the incoming MHL video stream into HDMI stream to be switched by video multiplexer 58. Video format conversion as well as other power and signals format conversions may be located inside the docking cradle 18 to better support modularity and reduce costs. This arrangement is shown in FIG. 3 below. Different types of docking cradle 18 may be provided, each supporting the requirements of different classes of second host platform 17 in terms of form factor, connectors and other mechanical and electrical requirements.

It should also be noted that Video Converter (VC) function 35 may be replaced with a USB docking controller chip that is similar to item 8 in this figure. This implementation enables USB docking interface at two of the host computer interfaces.

The preferred embodiment audio subsystem shown in this FIG. 2 is simplified to avoid cluttering. FIG. 8 below provides clearer block diagram of the audio components.

It should be noted that the communication protocol used by the docking device 201 (and other docking devices seen herein) to communicate with host computer 4 or host computer 17 may be USB 2.0, USB 3.0, Thunderbolt, DisplayPort, Firewire, Ethernet, HDMI, Infiniband or any other suitable protocol.

One drawback of such exemplary embodiment of the current invention is that USB switching from one host to the next disconnects the keyboard 15 and mouse 16 from the previously connected host and therefore causes long pause due to re-enumeration at every switch over. The exemplary embodiment showed in the next figure can overcome this drawback.

FIG. 3 illustrates another high-level functional diagram of a system 300 having a Docking Device 301 according to an exemplary embodiment of the current invention that is similar to the device 201 shown in FIG. 2 above, but it is further having multiple Device Emulators 36x and one Host emulator 27. In the figures and text herein, the term "x" following a number may indicate any one of similar or identical elements marked by that number.

User keyboard 15 and pointing device 16 are coupled to the Host Emulator (HE) 27 through USB ports 28 and 29. Host Emulator 27 emulating a computer Human Interface Device (HID) USB stack and is used in order to convert the USB signals into bi-directional serial signals coupled through lines 26 to the peripheral multiplexer 39. Host Emulator 27 may be implemented on a microcontroller, ASIC, FPGA or similar device. Peripheral multiplexer 39 switches the serial signals into first host Device Emulator (DE) 36a or second host Device Emulator 36b. Device emulators 36x are microcontrollers that are programmed to emulate a composite keyboard and mouse USB device. Incoming serial signals from multiplexer 39 are converted into standard USB device traffic. First Device Emulator 36a is coupled via USB line 25 to one of the USB Docking controller 8 USB ports.

Second Device emulator 36b is coupled via USB line 57 to the second host connector 24. First and Second Device Emulators 36x may be adapted to operate in different modes to support different connected host computers running different operating systems.

It should be noted that the multiplexer 39 may be integrated inside Host Emulator function 27.

The use of Host Emulator and multiple Device Emulators enable implementation of mouse cursor tracking function through the addition of another microcontroller function called System Controller (SC) 44. It should be noted that the System Controller function 44 may be implemented on the same microcontroller of the Host Emulator 27 to reduce costs and complexities.

System Controller function 44 may be connected to the Docking device controller chip 8 via lines 48 to enable docking functions control and indications through push buttons 47 and LEDs 51. System Controller 44 may also be connected to the multiplexer 58 via control line 59 and to the multiplexer 39 via control line 97 to enable user control of the active host computer.

The System Controller function (SC) 44 may be programmed to support various device management tasks such as:

1. Managing the device power up tests and indications;
2. Detect connected host computers characteristics through cradle memory device 40 or through directly connecting to the devices;
3. Configure the USB dock controller function 8 based on user or factory settings;
4. Sense user inputs from push buttons 47 or touch-screen and provide user indications through LEDs 51;
5. Manage file transfer and copy-paste functions from one host to the other;
6. Mange the cursor tracking function by interfacing with the host controller;
7. Detect and manage keyboard shortcuts to change operation modes and device settings;
8. Drive the various multiplexers;
9. Support device firmware upgrade and patching;
10. Manage the device power and charging settings and activities;
11. Manage the Bluetooth, WLAN and other wireless resources; and
12. Manage audio switching and mixing.

In addition to that, the System Controller function 44 may integrate the Host Emulator function 27.

User may select the active host computer by means of push buttons 47 which activates video multiplexer 58 via control line 59. LEDs indicators 51 indicated to the user which host is currently displayed.

Alternatively, Host Emulator function 27 may be pre-programmed to detect certain keyboard shortcuts (or key-combinations) to perform switching and control tasks.

Device Emulator 36b may also be coupled to a Bluetooth (BT), wireless LAN or another wireless transceiver 45 having an antenna 46 that enables wireless data/audio connection with the second host computer 17. System Controller function 44 may also be coupled to the second host computer connector 24 to enable platform detection and management functionality.

This embodiment of the current invention may be further programmed to enable mouse cursor switching mode. In this mode, the System Controller function 44 monitors the cursor movement (from the Host Emulator function 27 for example via channel 79. to avoid cluttering channel 79 had been omitted from some of the drawings) across the display area and automatically switches multiplexers 58 and 39 based on pre-programmed geometrical rules. This mode enables smooth transition of the keyboard 15 and mouse 16 between the two or more connected computer hosts without the need to operate push-buttons 47. The geometrical rules applied by the System Controller function 44 in cursor tracking mode may feature functionality such as:

1. Built-in host computer display on the left side, on top, on the bottom or to the right;
2. One or more user displays 2x located in various geometrical arrangements; and
3. Extended displays from one host computer.

Docking cradle 18 may also comprises an internal video conversion function (VC) 35 that converts the native video output format of host computer 17 into another format to be used inside the docking device 301. For example docking connector 19 may be Mini USB 3.0 Type with MHL support. Video Converted function 35 the converts the MHL into HDMI standard that is used by the docking device 301 and its one or more connected displays 2x.

In addition, docking cradle 18 may also have a configuration memory device 40. This device stores essential interface information that may be read by the System Controller function 44 via lines 37, connector 24 and lines 41 to enable "Plug and Play" operation with different modular cradles or cable 18. Configuration memory device 40 may be any type of non-volatile memory such as flash, Mask ROM etc.

For example—configuration memory device 40 may store the information about the host computer device 17 supported video formats.

Cradle 18 may also comprises of power converter circuitry (not seen in this figure) to support the device specific charging voltage power and data requirements.

This implementation of the current invention enables one docking device 301 design to be compatible with many different types of host computers.

For example:
1. Simple cable or cradle 18 having USB plug, DVI/HDMI plug and audio plugs may be used to connect desktop PC;
2. Cable or cradle 18 having USB Docking controller chip similar to 8 and USB 3 plug may be used to connect a second portable computer having USB 3.0 port;
3. Cable or cradle 18 having Apple Lightening electronic interface circuitry and Lightening plug may be used to connect Apple devices;
4. Cable or cradle 18 having MHL to HDMI converter circuitry may be used to connect certain Android computers; and:
5. Cable or cradle 18 having DockPort controller and mini DisplayPort plug.

In this embodiment of the current invention, power or charging to host computer 17 is further controlled by charger power controller function 67. This charger power controller function 67 contains circuitry that signals the host computer 17 to indicate available charging current. It may comply with industry standards such as USB Specification, Battery Charging Specification, Rev 1.2 (BC1.2) that defines Charging Downstream Port (CDP) and Dedicated Charging Port (DCP). It may also support Apple devices Sleep-Mode Charging. The charger power controller function 67 may be coupled to the USB lines 57 to enable charger device enumeration (of host computer 17) via USB to find its charging current characteristics.

It should be noted that charger power controller function 67 may be integrated inside the cradle or cable 18 and not inside docking device 301 as shown in this FIG. 3.

FIG. 4 illustrates yet another high-level functional diagram of a system 400 having a Docking Device 401 according to an exemplary embodiment of the current invention that is similar to the devices 201 and 301 shown in previous figures, but it is further supporting two user displays 2a and 2b.

In this exemplary embodiment of the current invention, primary display 2a is coupled to the USB Docking controller chip 8 via video output line 31 and primary display output 13a and video cable 14a. Secondary display 2b is coupled to second host computer 17 via cradle connector 19, video cable 23, video cable 64, optional internal video format converter 35, video line 56, secondary display port 13b and video cable 14b.

In this exemplary embodiment of the current invention, secondary display 2b may also display video output of a nearby host computer connected via datalink wireless receiver or transceiver 77 coupled to antenna 78. Such datalink may use standard protocols such as DLNA (Digital Living Network Alliance), Miracast, 5-WiGig, Wireless LAN, Zigbee etc.

In this embodiment, the user may share a single set of keyboard 15 and mouse 16 between two docked host computers 4 and 17 while each platform is connected to its own display 2a and 2b respectively.

In this embodiment of the current invention, USB line 57 from second host computer connector 24 is connected to a USB hub (HUB) 87. USB Hub 87 may be USB 2.0, USB 3.0 such as VIA VL812 or any other hub. USB Hub 87 connected to two downstream USB ports:

First USB downstream port 88a is connected to another peripheral multiplexer 89; and Second USB downstream port 88b is connected to the Device Emulator (DE) 36b. Peripheral multiplexer 89 control by the System Controller function 44 through line 90 to enable switching between USB host in host computer 17 and in host computer 4 through USB lines 91 connected to USB Docking controller chip 8 downstream USB port. Peripheral multiplexer 89 output is connected via lines 92 to USB port connector Type-A 85 located at the external surface of docking device 401. This port enables the user to connect a USB device such as web-cam that may be switched between host computers 4 and 17 as needed.

FIG. 5 illustrates yet another high-level functional diagram of system 500 having a Docking Device 501 according to an exemplary embodiment of the current invention that is similar to the device 401 shown in previous figure, but it is further supports dual head display output from primary host computer 4.

In this exemplary embodiment of the current invention, primary display 2a is coupled to the USB Docking controller chip 8 primary video output 31 while secondary display 2b is switchable to either: the USB Docking controller chip 8 secondary video output 32 or the video output of second host computer 17. Video switching is done through video multiplexer 33 controlled via control line 52 that is coupled to the System Controller function 44 to enable user control.

FIG. 6 illustrates yet another high-level functional diagram of a system 600 having a Docking Device 601 according to an exemplary embodiment of the current invention that is similar to the device 501 shown in previous figure, but it is further having a managed copy-paste or file transfer function to assist the user in transferring data between the two host computers 4 and 17.

In this exemplary embodiment of the current invention primary Device Emulator 36a is coupled via line 34a to the file transfer arbiter function (ARB) 38. Secondary Device Emulator 36b is coupled via line 34b to the same file transfer arbiter function 38.

File transfer arbiter function 38 receives data and copy-paste commands from the two or more connected host computers and controls the data path between host computers and between computers and optional local storage device 30. This local storage device may be implemented using a volatile memory or non-volatile memory technology to temporarily storing user data.

For example: file located on host computer 4 may be copied by the user into "drive S": visible in the host computer 4. This drive is in fact Device Emulator 36a enumerated through the USB docking controller chip 8 as a mass storage device.

Once the user switches to operating the host computer 17, the same drive S: is visible at that host computer 17 as well. The user then may copy the required file from drive S into a local storage at computer 17 to complete the file transfer.

File transfer arbiter function 38 may be further coupled to the System Controller function 44 to enable user management, control, configuration and indications.

Files larger than the local storage device 30 capacity may be copied through several consecutive write, read, delete cycles managed by the arbiter 38 or the system controller function 44.

It should be noted that the arbiter function 38 may be contained inside the system controller function 44 to reduce cost and complexity.

The exemplary embodiment of the current invention may be programmed to enable seamless file transfer between the host computers 4 and 17 and/or to enable clip-board type copy-paste function for data objects such as files or text.

An optional external mass storage device port 69 may be used to connect an external USB mass storage device as a shared memory between connected host computers. This port 69 is coupled to the file transfer arbiter function 38 to support larger files storage or files backup.

To further enhance the file transfer function, a clipboard copy paste function may be configured. Software application must be loaded on the host computers taking part in such transfer. The software application captures the clipboard text or file and copy it into pre-specified storage drive that represent the docking device 601 shared storage (30 and or the external mass storage device if connected to mass storage device port 69). Once copied into the storage 30 or to the external storage device, the clip-board content may be pasted by similar application into the other computer clip-board to enable paste function.

FIG. 7 illustrates yet another a high-level functional diagram of a system 700 having a Docking Device 701 according to an exemplary embodiment of the current invention that is similar to the device 601 shown in previous figure, but it is further having a Video Processing function (VP) 70 to enable video combination and overlay of the host computers video outputs.

Video processor function 70 is having at least two video receivers to receive the connected video inputs from the USB docking controller chip 8 via line 31 and from video format converter 35 via video line 56. In addition the Video processor function 70 may be connected also to the secondary video output of the USB docking controller chip 8 via line 32 to enable combined display of 3 sources.

Video processor function 70 is typically coupled to a Frame Buffer memory (FB) 71 to temporarily store displayed images data.

Video processor function 70 is further coupled to the primary display 2a via primary display output line 74a, primary display connector 13a and primary display cable 14a.

Similarly, Video processor function 70 may be coupled to the optional secondary display 2b via secondary display output line 74b, secondary display connector 13b and secondary display cable 14b.

Video processor function 70 may be programmed to enable at least some of the following video image combination features such as:

Picture in Picture
Windowing
Video overlay
Video scaling (up-scaling and down-scaling)
Video transparency
Minimizing video window to task bar
Video popup
Etc.

System Controller function 44 may be coupled to the Video processor function 70 by line 75 and to the Host Emulator 27 by line 79 to enable operation in modes such as dynamic windowing (wherein keyboard and mouse are used to change windows on screen).

FIG. 8 illustrates a high-level functional diagram of a system 800 showing the audio subsystem in the embodiments shown in FIGS. 2 to 7 above.

In this figure, the USB docking controller chip 8 analog audio input/output 84 are coupled to the audio multiplexer 80. For drawing clarity, audio multiplexer 80 is seen here as switch, however audio multiplexer 80 may be implemented using relays, solid-state switching logic, analog audio mixer, DSP (Digital Signal Processor) or any other function that may be used to route and affect audio streams. Audio multiplexer 80 is controlled by control line 81 coupled to the System Controller function 44.

Audio multiplexer 80 is also coupled to the second host computer 17 audio input/output through connector 24 and audio line 82. Audio multiplexer 80 may also be coupled to the optional Bluetooth or other wireless transceiver 45 audio input/output to enable wireless connection to nearby host computers. Nearby host computers may be one of, or both host computers 17 or 4.

Audio multiplexer 80 input/output (common) side is coupled to the one or more external audio connector 12 to enable connection of user headset, microphone, speakers or any other suitable audio device.

The exemplary embodiment of the current invention enables the user to configure it to perform at least some of the following audio related functions:

Switch one host audio output at a time;
Change volume and mix one or more host audio outputs;
Mute one or more audio outputs;
Select one or more host to connect the microphone to; and
Route one host audio output to one side (for example left) and another host output to the other side (for example right).
Perform audio equalizer function.
Amplify and drive speakers and optionally a subwoofer.

FIG. 9 illustrates a typical operational scenario 900 of the exemplary embodiment of the current invention while in cursor tracking mode.

In this example the multi-host docking device (not shown here) is connected to:

One docked laptop computer 4 having one built-in display 95 and one extended display 2a;
One docked iPhone device 17 having built-in display 96 and one extended display 2b; and
Single keyboard and a single mouse (not shown here).

Line 98 represents the cursor movement path (driven by the user's mouse movements). The circles 99x representing the transition points between displays—these are virtual points that the cursor leaves one display area and reappear on the nearby display area.

While the device is in cursor tracking mode and after it is properly configured to the illustrated geometry, it will operate as follow:

Transition point 99a where cursor leaves host computer 4 primary display 95 to secondary display 2a is managed by the host computer 4 operating system. No switching is needed in the device. Keyboard and mouse remain switched to host computer 4;
Transition point 99b where cursor leaves host computer 4 secondary display 2a to host computer 17 secondary display 2b is managed by the device—keyboard and mouse are being automatically switched from host computer 4 to host computer 17;

Transition point 99c where cursor leaves host computer 17 secondary display 2b to primary display 96 is managed by the host computer 17 operating system. No switching is needed in the device. Keyboard and mouse remain switched to host computer 17;

Transition point 99d where cursor leaves host computer 17 primary display 96 to secondary display 2b is managed by the host computer 17 operating system. No switching is needed in the device. Keyboard and mouse remain switched to host computer 17; and Transition point 99e where cursor leaves host computer 17 secondary display 2b to host computer 4 secondary display 2a is managed by the device—keyboard and mouse are being automatically switched from host computer 17 to host computer 4.

The preferred embodiment of the current invention enables field configuration of the desired system layout. User may enter parameters such as: display assignment, display size, relative locations, cursor speed and acceleration etc.

FIG. 10 illustrates a typical operational scenario 1000 of the exemplary embodiment of the current invention while in combiner mode.

Device x01 is coupled to host computer 4 on one side and host computer 17 on the other through cable or wireless connections. Device x01 configured to operate in combiner mode drives two displays —2a and 2b.

While is combiner mode the following example illustrates the operating method:

Video output from host computer 4 is showed on display 2a (109) and extended into display 2b (104). Outputs may be scaled up and down by the user or automatically to fit displays' size.

Video output from host computer 17 is sowed in "Picture-in-Picture" (PIP) window appearing partially on display 2a (102) and on display 2b (103). The user may downscale and upscale the window and drag it to the left or to the right as needed. The user may also minimize the host computer video window to a taskbar.

On-Screen-Display (OSD) may be implemented to enhance system usability by providing video source name text and colored frame.

It should be noted that PIP may be displayed on only one of the screens 2a or 2b. Multiple PIPs may be displayed if more than two hosts are connected. Additional System Information (SI), for example icons, menus etc. which are related to actions and configuration of the device x01 or the system 1000 may be displayed. For example, the names and other information related to files stored in drive S, or items in the clipboard may be presented on the screen. Icons showing the connected hosts and their statuses may be presented on the screen.

In some embodiments, the user may logically disconnect a host computer without disconnecting it physically, or connect and disconnect a host that is wirelessly connected to the device x01 by using the keyboard or mouse. In some embodiments the system reconfiguration is done using a GUI (Graphical User Interface) presented as a PIP or a task bar or in other form on display 2x.

In some embodiments, the user can move and or change the relative positions and size of the displayed windows.

In some embodiments, the PIP, OSD and/or other displayed icons menus structures are generated by SC 44.

In some embodiments, dragging an item from a display designated to a first host computer to a display designated to a second host computer performs moving or copying the item from the first host to the second host. This function transforms the device x01 into a cross platform intuitive GUI.

In this document, the term "microcontroller function" or other references to "function" or "functions" may refer to hardware capable of performing the logical function. The hardware may comprise one or a plurality of electronic circuitries. The hardware may be based on an ASIC (Application Specific Integrated Circuit), a processor accompanied with the necessary memory, a programmable device such as FPGA (Field Programmable Gate Array), or other device or devices capable of performing the desired function. The block diagrams seen here may refer to the function (rather then the hardware sub-units) since modern logical hardware are capable of performing several functions. Thus, a plurality of logical functions may be performed by the same hardware. Alternatively, each logical function may be performed by a dedicated hardware, for example a single chip, or several chips. A man skilled in the art of electronics may find several ways to realize and implement the "function" or "functions". All such implementations are within the scope of this invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A Multi-Host Docking Device comprising:
   at least one user peripheral interface to interface with user keyboard and user pointing device;
   at least one Host Emulator connected to said at least one user peripheral interface to emulate computer host stack so as to interact with said user keyboard and user pointing device;
   at least one first Device Emulator and at least one second Device Emulator to emulate a keyboard and a mouse;
   at least one multiplexer to switch signals from said at least one Host Emulator to said at least one first Device Emulator and at least a second Device Emulator;
   at least one first host interface and at least a second host interface to connect at least one first host computer and at least one second host computer, respectively, wherein said at least one first host interface and at least one second host interface are capable of interfacing said at least one first Device Emulator and at least one second Device Emulator with said at least one first host computer and said at least one second host computer, respectively, and wherein said at least one first host interface and at least one second host interface are capable of receiving display data from said at least one first host computer and said at least one second host computer, respectively;
   at least one video multiplexer to multiplex display data of said at least one first host computer and said at least one second host computer to at least one display output;
   a selector to enable user selection between one of said at least one first host computer and said at least one second host computer; and
   an Arbiter, comprising a memory to enable temporary data storage, said Arbiter being connected to said at least one first Device Emulator and to said at least one second Device Emulators, said Arbiter being configured to enable clipboard and file data transfer between said at least one first host computer and at least one second host computers, by:
      (a) copying said clipboard and file data from said at least one first host computer to said memory, and
      (b) pasting said clipboard and file data from said memory to said at least one second host computer.

2. The Multi-Host Docking Device of claim 1, wherein at least one of said at least one first host interfaces and at least a second host interface is a USB interface.

3. The Multi-Host Docking Device of claim 1, further comprising a System Controller capable of performing cursor tracking.

4. The Multi-Host Docking Device of claim 3, wherein said System Controller is capable of managing the Multi-Host Docking Device.

5. The Multi-Host Docking Device of claim 1, wherein at least one of said at least a first host interface and at least a second host interface is a Docking cradle having physical form factor to support a specific class of mobile computing devices.

6. The Multi-Host Docking Device of claim 5, wherein said Docking cradle is a modular cradle external to the Multi-Host Docking Device, and wherein said Docking cradle comprises a video conversion function to convert the native video output format of the corresponding host computer into another format to be used inside the docking device.

7. The Multi-Host Docking Device of claim 1, wherein said at least one video multiplexer is capable of interfacing with at least one primary display and at least one secondary display.

8. The Multi-Host Docking Device of claim 7, wherein said at least one video multiplexer is capable of:
   displaying video signals from said first host computer on said at least one primary display, and
   said at least one video multiplexer is further capable of switching said at least one secondary display to display video signals from either one of said at least one first host computer, or said at least one second host computer.

9. The Multi-Host Docking Device of claim 1, wherein said at least one video multiplexer is a video processor capable of combining video signals from said at least one first host computer with video signals of said at least one second host computer.

10. The Multi-Host Docking Device of claim 1, further comprising at least one video converter to convert the native video output format, which is native to at least one of said at least one first host computer and said at least one second host computer into another format to be used within the docking device.

11. The Multi-Host Docking Device of claim 1, further comprising;
   an external audio connector; an
   an audio multiplexer,
   wherein said audio multiplexer is capable of:
      receiving input audio signals from said first and said second host computers, and
      transmitting output audio signals to said external audio connector.

12. The Multi-Host Docking Device of claim 11, wherein said output audio signals are audio mixture of said input audio signals which were received from said first and said second host computers.

13. The Multi-Host Docking Device of claim 11, wherein said audio multiplexer is capable of receiving input audio signals from said external audio connector and switch said input audio signals between said at least one first host computer and said at least one second host computer.

14. The Multi-Host Docking Device of claim 1, wherein at least one of the first and the second host interfaces is a wireless interface.

15. The Multi-Host Docking Device of claim 14, wherein said wireless interface is capable of communicating video signals.

16. The Multi-Host Docking Device of claim 14, wherein said wireless interface is capable of communicating audio signals.

17. The Multi-Host Docking Device of claim 1, wherein at least one of said at least one first host interface and at least one second host interface is capable of charging a corresponding host computer.

18. The Multi-Host Docking Device of claim 1, further comprising at least a first physical lock, said first physical lock is configured to lock at least one of said first and said second host computers to the Multi-Host Docking Device.

19. The Multi-Host Docking Device of claim 18, further comprising at least a second physical lock, said second physical lock is configured to lock the Multi-Host Docking Device to a bulk object.

* * * * *